US012694843B2

(12) United States Patent
Guo et al.

(10) Patent No.: US 12,694,843 B2
(45) Date of Patent: Jul. 28, 2026

(54) ELECTROPHORETIC DISPLAY PANEL AND DISPLAY DEVICE

(71) Applicant: Shanghai Tianma Microelectronics Co., Ltd., Shanghai (CN)

(72) Inventors: Wanlong Guo, Shanghai (CN); Tian Xia, Shanghai (CN)

(73) Assignee: Shanghai Tianma Microelectronics Co., Ltd., Shanghai (CN)

( * ) Notice: Subject to any disclaimer, the term of this patent is extended or adjusted under 35 U.S.C. 154(b) by 0 days.

(21) Appl. No.: 19/074,921

(22) Filed: Mar. 10, 2025

(65) Prior Publication Data

US 2025/0210002 A1 Jun. 26, 2025

(30) Foreign Application Priority Data

Oct. 23, 2024 (CN) ........................ 202411489978.9

(51) Int. Cl.
*G09G 3/34* (2006.01)
*G09G 3/20* (2006.01)

(52) U.S. Cl.
CPC ........... *G09G 3/344* (2013.01); *G09G 3/2014* (2013.01); *G09G 2310/065* (2013.01); *G09G 2310/068* (2013.01); *G09G 2320/0233* (2013.01); *G09G 2320/064* (2013.01)

(58) Field of Classification Search
CPC ................. G09G 3/344; G09G 3/2014; G09G 2310/065; G09G 2310/068; G09G 2320/0233; G09G 2320/064
USPC .................................................. 345/690–691
See application file for complete search history.

(56) References Cited

U.S. PATENT DOCUMENTS

| | | | | |
|---|---|---|---|---|
| 7,193,625 B2 * | 3/2007 | Danner | G09G 3/2007 | 345/36 |
| 2009/0179923 A1 * | 7/2009 | Amundson | G09G 3/2018 | 345/690 |
| 2009/0267969 A1 * | 10/2009 | Sakamoto | G09G 3/344 | 345/690 |
| 2011/0249043 A1 * | 10/2011 | Sato | G09G 3/344 | 345/107 |
| 2013/0120473 A1 * | 5/2013 | Yamada | G09G 3/344 | 345/107 |
| 2022/0238077 A1 * | 7/2022 | Lin | G02F 1/1685 | |

* cited by examiner

*Primary Examiner* — Kwin Xie
(74) *Attorney, Agent, or Firm* — KDW Firm PLLC

(57) ABSTRACT

An electrophoretic display panel includes a first substrate, electrophoretic particles, a scan line, a data line, and a pixel. The scan line, the data line, and the pixel are located on the same side of the first substrate facing the electrophoretic particles. The scan line is configured to transmit a scan signal to the pixel. The data line is configured to transmit a data signal to the pixel, and a data signal includes multiple unit periods. In a write state in a drive stage of the electrophoretic display panel, the data signal includes a drive signal and at least one adjustment signal inserted into the drive signal and configured to divide the drive signal into at least two drive sub-signals, and a voltage of a drive sub-signal of the at least two drive sub-signal is different from a voltage of an adjustment signal in a unit period.

18 Claims, 12 Drawing Sheets

ELECTROPHORETIC DISPLAY PANEL AND DISPLAY DEVICE

CROSS-REFERENCE TO RELATED APPLICATION

This application claims the priority to Chinese Patent Application No. CN2024114899789, filed on Oct. 23, 2024, the disclosure of which is incorporated herein by reference in its entirety.

TECHNICAL FIELD

The present application relates to the field of display technology and, in particular, to an electrophoretic display panel and a display device.

BACKGROUND

Electronic paper (E-paper) is a display screen in which electronic ink is coated on a thin film, attached to a thin-film transistor circuit, and driven to form pixel graphics. The electronic paper has the advantages of energy saving, eye protection, and the ability to maintain display even after power outages and can imitate the visual perception of printing and writing on paper. The principle of the electronic paper is to use electrophoresis of charged particles, which causes the electronic paper to display a color of charged particles on a side of a transparent electrode. The electrophoresis of charged particles refers to a phenomenon in which two oppositely charged particles move to two electrodes of a display under the drive of an electric field.

Pulse-width modulation (PWM) is usually used to drive the charged particles in the related art. However, for the PWM drive, the achievable brightness level is $n=t/(1/f)$, where t denotes the response time and f denotes the drive frequency. The response time is related to the characteristics of a material, and the drive frequency is limited by the charging state of a pixel, so the brightness level is not enough to achieve an accurate grayscale. In other words, the required target grayscale cannot be achieved by simply changing the drive time. The PWM cannot distinguish enough brightness levels and support accurate grayscale adjustment.

SUMMARY

Based on the preceding problems, the present application provides an electrophoretic display panel and a display device. In this manner, at least one adjustment signal brings a small amount of adjustment to the display brightness change so that the brightness can be adjusted more precisely. The at least one adjustment signal is arranged so that the display brightness of pixels can be controlled accurately, thereby achieving the target brightness.

An embodiment of the present application provides an electrophoretic display panel.

The electrophoretic display panel includes a first substrate and electrophoretic particles; and a scan line, a data line, and a pixel, where the scan line, the data line, and the pixel are located on a same side of the first substrate facing the electrophoretic particles, the scan line is configured to transmit a scan signal to the pixel, and the data line is configured to transmit a data signal to the pixel, where the data signal includes a plurality of unit periods.

In a write stage in a drive stage of the electrophoretic display panel, the data signal includes a drive signal and at least one adjustment signal inserted into the drive signal and configured to divide the drive signal into at least two drive sub-signals. A voltage of a drive sub-signal of the at least two drive sub-signals is different from a voltage of an adjustment signal of the at least one adjustment signal in a unit period of the plurality of unit periods.

An embodiment of the present application provides a display device. The display device includes the electrophoretic display panel described in the first aspect.

DETAILED DESCRIPTION

Figure 1:
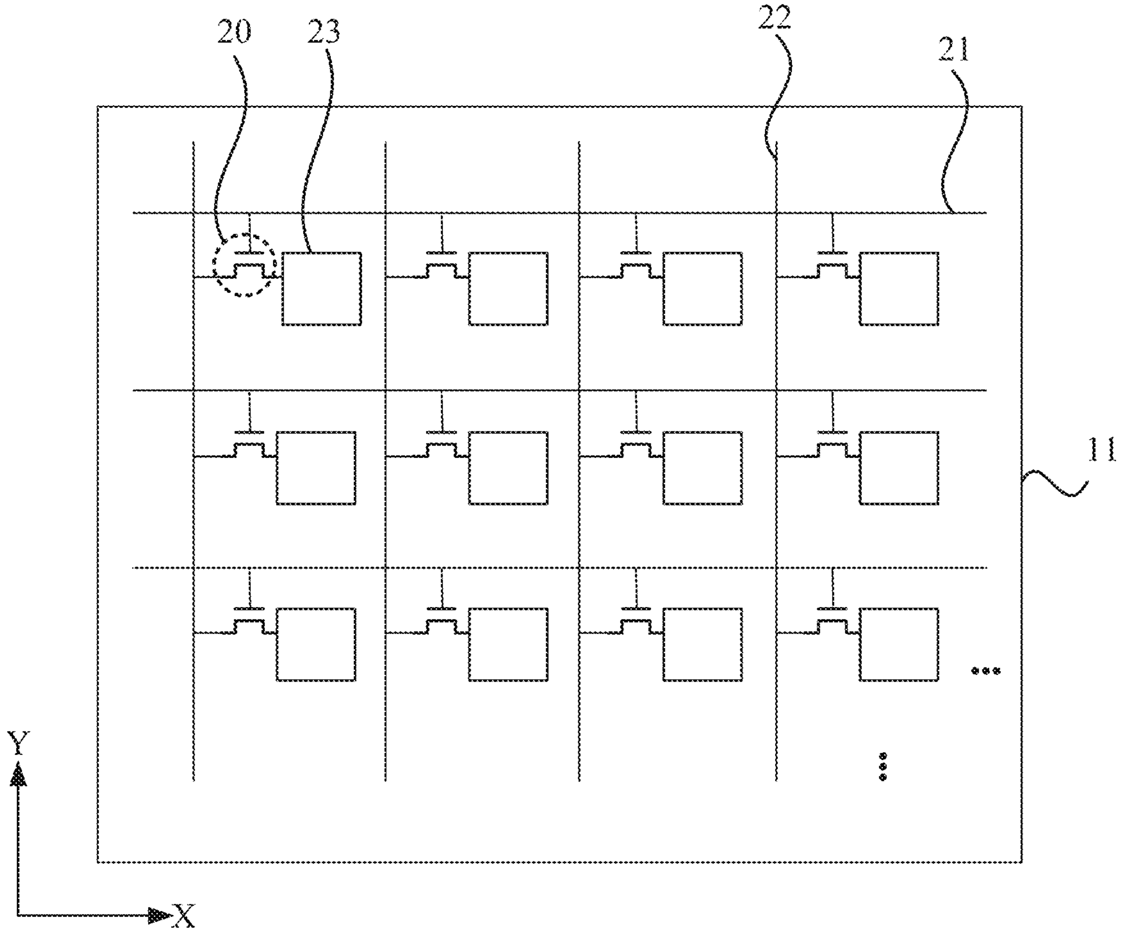
FIG. 1 is a top diagram of an electrophoretic display panel according to an embodiment of the present application.

The present application is further described in detail below in conjunction with the drawings and embodiments. It is to be understood that the embodiments described herein are intended to illustrate the present application and not to limit the present application. Additionally, it is to be noted that for ease of description, only part, not all, of structures related to the present application are illustrated in the drawings.

Figure 2:
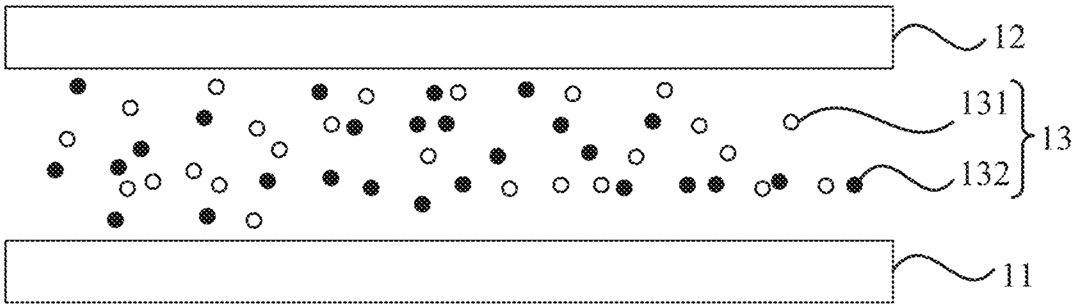
FIG. 2 is a cross-sectional diagram of an electrophoretic display panel according to an embodiment of the present application.

FIG. 1 is a top diagram of an electrophoretic display panel according to an embodiment of the present application. FIG. 2 is a cross-sectional diagram of an electrophoretic display panel according to an embodiment of the present application. Referring to FIGS. 1 and 2, an electrophoretic display panel provided in an embodiment of the present application includes a first substrate 11 and electrophoretic particles 13 located on a side of the first substrate 11. The electrophoretic display panel includes a scan line 21, a data line 22, and a pixel 23 located on a side of the first substrate 11 facing the electrophoretic particles 13. That is, the scan line 21, the data line 22, and the pixel 23 are arranged on the first substrate 11, and the electrophoretic particles 13 are arranged on the side where the scan line 21, the data line 22, and the pixel 23 are arranged. Multiple scan lines 21 extend along a first direction X and are arranged along a second direction Y, and multiple data lines 22 extend along the second direction Y and are arranged along the first direction X. The first direction X intersects the second direction Y. The scan line 21 is configured to transmit a scan signal to the pixel 23 and the scan signal is a signal for controlling a thin-film transistor 20 to turn on. The data line 22 is configured to transmit a data signal to the pixel 23. When the thin-film transistor 20 is turned on, the data signal is written into the pixel 23. Different data signals are written into different pixels 23 so that the electrophoretic display panel can display a specific image.

Figure 3:
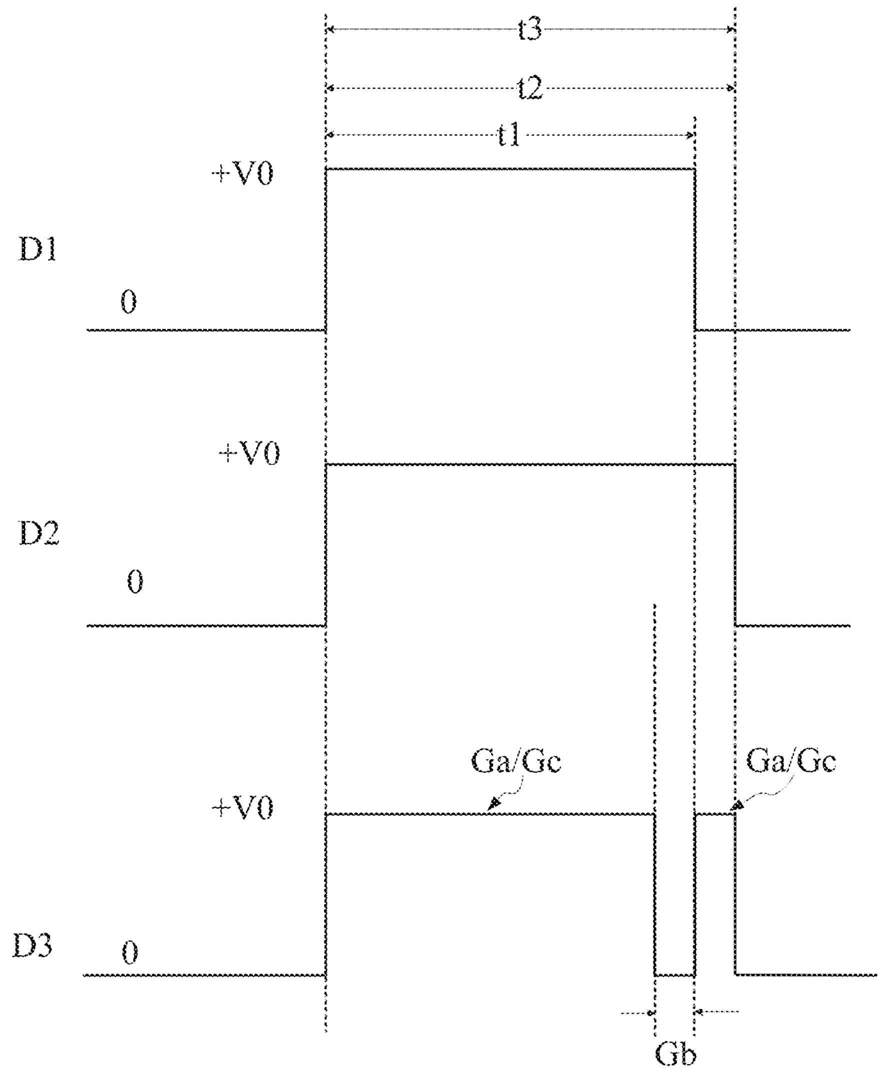
FIG. 3 is a drive timing diagram of an electrophoretic display panel according to an embodiment of the present application.
Figure 4:
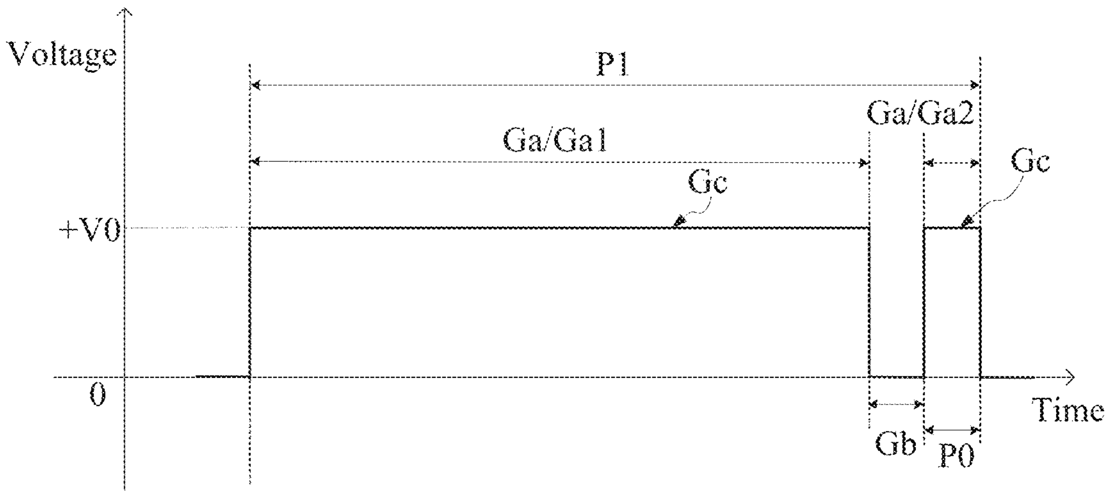
FIG. 4 is another drive timing diagram of an electrophoretic display panel according to an embodiment of the present application.

FIG. 3 is a drive timing diagram of an electrophoretic display panel according to an embodiment of the present application. FIG. 4 is another drive timing diagram of an electrophoretic display panel according to an embodiment of the present application. Referring to FIGS. 3 and 4, a data signal includes multiple unit periods P0. The duration of an enable level of the data signal is an integer multiple of a unit period P0. In an embodiment, the duration of the unit period P0 is the duration of a scan frame. Referring to FIG. 1, in one scan frame, the scan lines 21 are scanned row by row from the first scan line 21 to the last scan line 21.

Referring to FIGS. 1 and 4, the drive stage of the electrophoretic display panel includes a write stage P1. In the write stage P1, different data signals are provided for different pixels 23 so that the different pixels 23 can have different display brightness and different grayscales.

As shown in FIG. 3, if the data signals in the write stage include a first drive signal D1, the duration of the first drive signal D1 is t1, and the brightness of the pixels driven by the first drive signal D1 is L1. If the data signals in the write stage include a second drive signal D2, the duration of the second drive signal D2 is t2, and the brightness of the pixels driven by the second drive signal D2 is L2. The target brightness of the electrophoretic display panel is Ln, and $L1<Ln<L2$. $t2>t1$, and $t2-t1=P0$. If the first drive signal D1 or the second drive signal D2 is only used, the display brightness of the pixels cannot be controlled accurately, and the target brightness cannot be achieved.

As shown in FIGS. 3 and 4, in the write stage P1, the data signals include a drive signal Ga and at least one adjustment signal Gb. The at least one adjustment signal Gb is inserted into the drive signal Ga to divide the drive signal Ga into at least two drive sub-signals Gc. That is, the drive signal Ga includes the at least two drive sub-signals Gc, and an adjustment signal Gb is arranged between two drive sub-signals Gc. The voltage of a drive sub-signal of at least one drive sub-signal Gc is different from the voltage of the adjustment signal Gb in a unit period P0.

Exemplarily, the data signals including one adjustment signal Gb are used as an example for illustration in FIGS. 3 and 4, the adjustment signal Gb is inserted into the drive signal Ga to divide the drive signal Ga into two drive sub-signals Gc, and the adjustment signal Gb is arranged between the two drive sub-signals Gc. The voltage of a drive sub-signal Gc is +V0, and the voltage of the adjustment signal Gb in the unit period P0 is 0. V0 is greater than 0.

In the electrophoretic display panel provided in the embodiment of the present application, the at least one adjustment signal Gb is inserted into the drive signal Ga in the write stage P1, and the voltage of the drive sub-signal Gc is different from the voltage of the adjustment signal Gb in the unit period P0. In this manner, the adjustment signal Gb brings a small amount of adjustment to the display brightness change so that the brightness can be adjusted more precisely. The adjustment signal Gb is arranged so that the display brightness of the pixels can be controlled accurately, thereby achieving the target brightness.

Exemplarily, referring to FIGS. 1 and 2, the first substrate 11 includes a drive circuit layer; the drive circuit layer includes multiple pixel circuits, and a pixel circuit may include a circuit structure of 1T1C or 1T2C. In other embodiments, the pixel circuit may also include a circuit structure of 2T1C, 4T1C, 7T1C, 7T2C, 8T1C, or 8T2C, and the pixel circuit includes multiple thin-film transistors (TFT), storage capacitors, and metal wires. A source or drain of a thin-film transistor 20 of at least one thin-film transistor 20 is electrically connected to a pixel electrode of a pixel 23 and is configured to provide a data signal for the pixel 23 to drive electrophoretic particles 13 to move to the target position under the action of an electric field. The type of the pixel circuit is not limited in the embodiment of the present application.

Exemplarily, referring to FIGS. 1 and 2, the electrophoretic display panel further includes a second substrate 12, the first substrate 11 and the second substrate 12 are arranged opposite to each other, and the electrophoretic particles 13 are located between the first substrate 11 and the second substrate 12. The electrophoretic particles 13 include black electrophoretic particles 132 and white electrophoretic particles 131. Under the action of the electric field, when the black electrophoretic particles 132 are located on a display side of the electrophoretic display panel (for example, a side of the second substrate 12 facing away from the first substrate 11), light is absorbed by the black electrophoretic particles 132 so that less light can be reflected to human eyes; such a region appears as a dark region to the human eyes, and the grayscale value is recorded as 0. When the white electrophoretic particles 131 are located on the display side of the electrophoretic display panel, light is reflected by the white electrophoretic particles 131 so that more light can be reflected to the human eyes; such a region appears as a bright region to the human eyes, and the grayscale value is Recorded as 255. When the black electrophoretic particles 132 and the white electrophoretic particles 131 are located between the second substrate 12 and the first substrate 11, part of the light is reflected, and part of the light is absorbed; such a region appears as a gray region to the human eyes, and the grayscale value is between 0 and 255. The embodiment of the present application is explained using a dual-particle system, but is not limited thereto. In other embodiments, the electrophoretic particles 13 may also include a multi-particle system that includes at least three types of electrophoretic particles.

Exemplarily, referring to FIGS. 1 and 2, the scan line 21 is configured to transmit the scan signal, and a scan signal includes a scan enable level and a scan disable level. In the period where the scan enable level exists, the data signal may be written into the pixel electrode of the pixel 23. In the period where the scan disable level exists, the data signal cannot be written into the pixel electrode of the pixel 23. The data line 22 is configured to transmit the data signal, and the data signal includes a data enable level and a data disable level. The data enable level is a level that changes the generation of the electric field required to drive the electrophoretic particles 13 to move, and the data disable level is a level that does not generate the electric field required to drive the electrophoretic particles 13 to move.

Optionally, referring to FIGS. 1 to 4, in the write stage P1, the difference between the brightness of the pixel 23 driven by the data signal and the brightness of the pixel driven by the drive signal Ga is a brightness difference, and the brightness difference is less than the brightness change value of the pixel 23 driven by the drive signal Ga in the unit period P0. The brightness change value of the pixel 23 driven by the drive signal Ga in the unit period P0 refers to the difference between the brightness of the pixel 23 at the end time of the unit period P0 and the brightness of the pixel 23 at the start time of the unit period P0.

Exemplarily, with continued reference to FIGS. 1, 3, and 4, in the write stage P1, the brightness of the pixel driven by the drive signal Ga is L1. The brightness of the pixel 23 driven by the data signal is the sum of the brightness of the pixel driven by the drive signal Ga and the adjustment signal Gb, and the brightness of the pixel 23 driven by the data signal is Ln. The brightness difference is Ln−L1. The brightness change value of the pixel 23 driven by the drive signal Ga in the unit period P0 is a change value, and the generated brightness change value varies with different positions of the unit period P0 in the data signal. However, no matter what the position of the unit period P0 in the data signal is, the generated brightness change value is greater than (Ln−L1).

In this manner, a brightness change value that is less than one frame of the drive signal may be introduced into the display brightness, and the display brightness between the display brightness L1 and the display brightness L2 can be precisely adjusted to the target brightness Ln.

Figure 5:
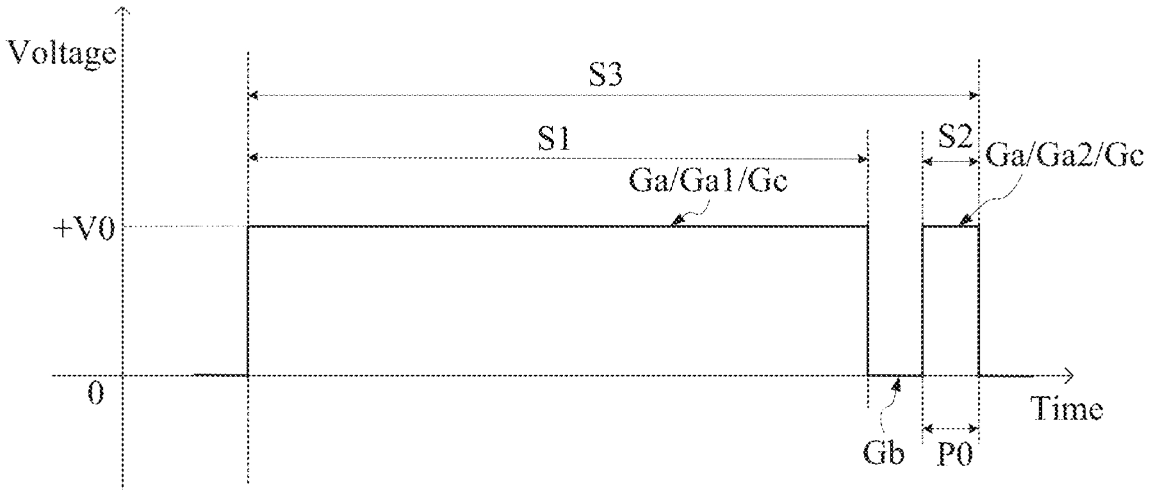
FIG. 5 is another drive timing diagram of an electrophoretic display panel according to an embodiment of the present application.

FIG. 5 is another drive timing diagram of an electrophoretic display panel according to an embodiment of the present application. Referring to FIGS. 1, 4, and 5, the interval between the start time of the adjustment signal Gb and the start time of the drive signal Ga is a first interval S1, and the interval between the end time of the adjustment signal Gb and the end time of the drive signal Ga is a second interval S2. The first interval S1 is greater than the second interval S2. When the drive signal Ga includes drive sub-signals Gc, the start time of the drive signal Ga refers to the start time of the first drive sub-signal Gc in the drive signal Ga. The end time of the drive signal Ga refers to the end time of the last drive sub-signal Gc in the drive signal Ga. At the end position of the drive signal Ga, the accumulation degree of the electrophoretic particles 13 is larger, and the accumulation has been completed or is close to completion. A built-in electric field caused by the distribution of the electrophoretic particles 13 is stronger. In the embodiment of the present application, the adjustment signal Gb is arranged in the second half of the drive signal Ga and has a greater release effect on the built-in electric field. Compared with arranging the adjustment signal Gb in the first half of the drive signal Ga, a larger brightness change value can be brought to the electrophoretic display panel.

The built-in electric field refers to an electric field formed in a semiconductor or insulator due to internal effects and is not an external electric field.

Exemplarily, referring to FIGS. 4 and 5, the two drive sub-signals Gc in the drive signal Ga are a first drive sub-signal Ga1 and a second drive sub-signal Ga2. The first drive sub-signal Ga1 precedes the second drive sub-signal Ga2. The adjustment signal Gb is arranged between the first drive sub-signal Ga1 and the second drive sub-signal Ga2. The duration of the adjustment signal Gb is one unit period P0, and the voltage of the adjustment signal Gb in the unit period P0 is 0. The start time of the drive signal Ga is the start time of the first drive sub-signal Ga1. The interval between the start time of the adjustment signal Gb and the start time of the first drive sub-signal Ga1 is the first interval S1, and the first interval S1 is equal to 11 P0s. The end time of the drive signal Ga is the end time of the second drive sub-signal Ga2. The interval between the end time of the adjustment signal Gb and the end time of the second drive sub-signal Ga2 is the second interval S2, and the second interval S2 is equal to one P0. The first interval S1 is greater than the second interval S2, that is, 11 P0s>P0.

Optionally, referring to FIGS. 4 and 5, the interval between the start time of the adjustment signal Gb and the start time of the drive signal Ga is the first interval S1. The interval between the start time of the drive signal Ga and the end time of the drive signal Ga is a third interval S3. The first interval S1 is greater than or equal to half of the third interval S3. In the embodiment of the present application, the adjustment signal Gb is arranged in the second half of the drive signal Ga and has a greater release effect on the built-in electric field. Compared with arranging the adjustment signal Gb in the first half of the drive signal Ga, a larger brightness change value can be brought to the electrophoretic display panel.

It is to be noted that when the first interval S1 is compared with half of the third interval S3, not only the magnitude of the first interval S1 and the magnitude of the second interval S2 but also the duration of the adjustment signal Gb are involved.

Exemplarily, referring to FIGS. 4 and 5, the start time of the drive signal Ga is the start time of the first drive sub-signal Ga1. The start time of the adjustment signal Gb is the end time of the first drive sub-signal Ga1. The interval between the start time of the adjustment signal Gb and the start time of the first drive sub-signal Ga1 is the first interval S1, and the first interval S1 is equal to 11 P0s. The end time of the adjustment signal Gb is the start time of the second drive sub-signal Ga2. The interval between the end time of the adjustment signal Gb and the end time of the second drive sub-signal Ga2 is the second interval S2, and the second interval S2 is equal to one P0. The end time of the drive signal Ga is the end time of the second drive sub-signal Ga2. The interval between the start time of the drive signal Ga and the end time of the drive signal Ga is the third interval S3; the third interval S3 is equal to 13 P0s, and the first interval S1 is greater than half of the third interval S3, that is, 11 P0s>6.5 P0s.

Figure 6:
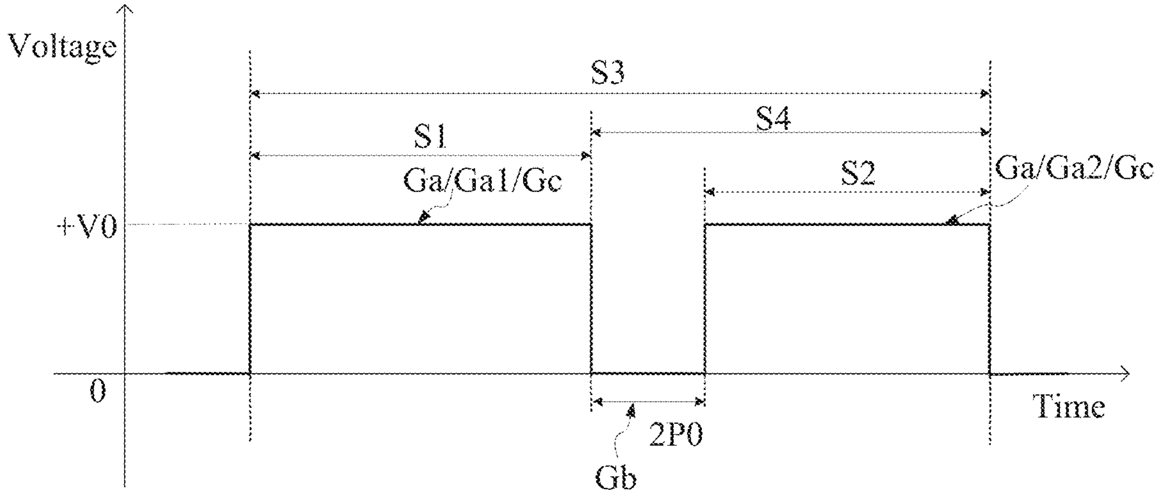
FIG. 6 is another drive timing diagram of an electrophoretic display panel according to an embodiment of the present application.

FIG. 6 is another drive timing diagram of an electrophoretic display panel according to an embodiment of the present application. Referring to FIG. 6, the interval between the start time of the adjustment signal Gb and the start time of the drive signal Ga is the first interval S1, and the interval between the start time of the adjustment signal Gb and the end time of the drive signal Ga is a fourth interval S4. The first interval S1 is less than the fourth interval S4.

Exemplarily, referring to FIG. 6, the duration of the adjustment signal Gb is greater than or equal to two unit periods P0, and though the first interval S1 is less than the fourth interval S4, the first interval S1 greater than the second interval S2 is still satisfied. The adjustment signal Gb is arranged in the second half of the drive signal Ga and has the greater release effect on the built-in electric field. Compared with arranging the adjustment signal Gb in the first half of the drive signal Ga, a larger brightness change value can be brought to the electrophoretic display panel.

Exemplarily, referring to FIG. 6, the interval between the start time of the adjustment signal Gb and the start time of the drive signal Ga is the first interval S1, the first interval S1 is six POs, and the duration of the adjustment signal Gb is two unit periods P0. The end time of the adjustment signal Gb is the start time of the second drive sub-signal Ga2. The interval between the end time of the adjustment signal Gb and the end time of the second drive sub-signal Ga2 is the second interval S2, and the second interval S2 is equal to five P0s. The end time of the drive signal Ga is the end time of the second drive sub-signal Ga2. The interval between the start time of the adjustment signal Gb and the end time of the drive signal Ga is the fourth interval S4, and the fourth interval S4 is equal to 7 P0s. The fourth interval S4 is greater than the first interval S1, that is, 7 P0s>6 P0s.

Based on the preceding embodiments, referring to FIGS. 3 and 4, the last drive sub-signal includes a unit period P0. In the embodiment of the present application, the adjustment signal Gb is inserted before the last unit period P0 of the drive signal Ga. At this time, the built-in electric field of the electrophoretic particles is strong, and the adjustment signal Gb has a greater release effect on the built-in electric field of the electrophoretic particles so that a larger brightness change value can be brought to the electrophoretic display panel.

Figure 7:
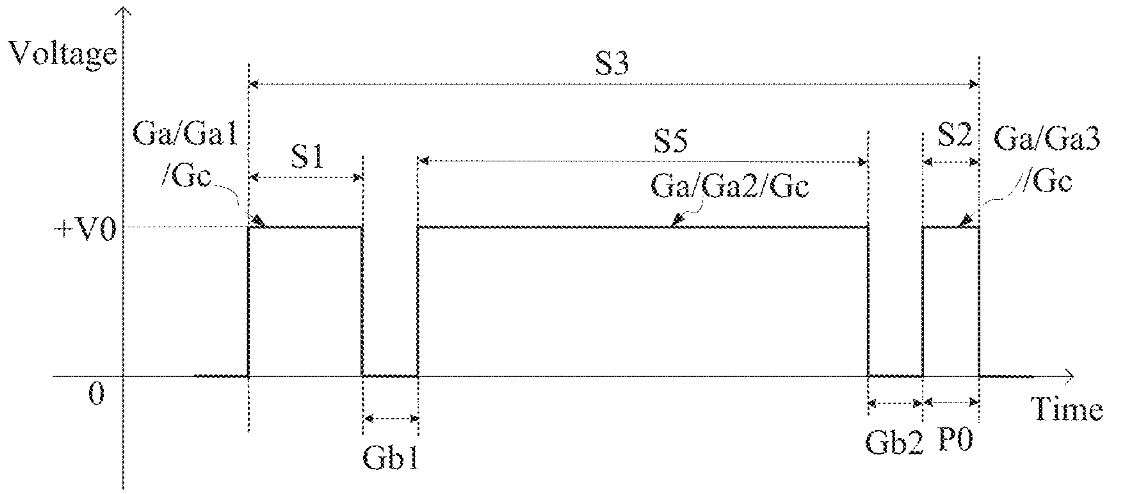
FIG. 7 is another drive timing diagram of an electrophoretic display panel according to an embodiment of the present application.

FIG. 7 is another drive timing diagram of an electrophoretic display panel according to an embodiment of the present application. Referring to FIG. 7, multiple adjustment signals Gb are provided and include a first adjustment signal Gb1 and a second adjustment signal Gb2, and the first adjustment signal Gb1 precedes the second adjustment signal Gb2. At least one drive sub-signal Gc exists between the first adjustment signal Gb1 and the second adjustment signal Gb2. In the embodiment of the present application, the first adjustment signal Gb1 and the second adjustment signal Gb2 that are not adjacent may be inserted into the drive signal Ga to divide the drive signal Ga into three drive sub-signals Gc, namely, the first drive sub-signal Ga1, the second drive sub-signal Ga2, and a third drive sub-signal Ga3. The built-in electric field is released in the duration of the first adjustment signal Gb1 and the duration of the second adjustment signal Gb2 so that a larger brightness change value can be brought to the electrophoretic display panel, thereby improving the adjustment accuracy of the brightness change value.

Optionally, referring to FIG. 7, the duration of the second adjustment signal Gb2 is at least one unit period P0, and the interval between the end time of the first adjustment signal Gb1 and the start time of the second adjustment signal Gb2 is a fifth interval S5. The duration of the second adjustment signal Gb2 is less than the fifth interval S5. It is also to be understood that the fifth interval S5 is the time for establishing the built-in electric field, and the duration of the second adjustment signal Gb2 is the time for eliminating the built-in electric field. In the embodiment of the present application, considering that the adjustment signals Gb can play a role in reducing the built-in electric field, and the time for establishing the built-in electric field is greater than the time for eliminating the built-in electric field, the duration of the second adjustment signal Gb2 is less than the fifth interval S5.

Exemplarily, referring to FIG. 7, the first adjustment signal Gb1 and the second adjustment signal Gb2 are spaced apart and release the built-in electric field at different time periods respectively. The first adjustment signal Gb1 precedes the second adjustment signal Gb2, and the second adjustment signal Gb2 has a greater release effect on the built-in electric field than the first adjustment signal Gb1 so that a larger brightness change value can be brought to the electrophoretic display panel.

Exemplarily, referring to FIG. 7, the end time of the first adjustment signal Gb1 is the start time of the second drive sub-signal Ga2, and the start time of the second adjustment signal Gb2 is the end time of the second drive sub-signal Ga2. The duration of the second adjustment signal Gb2 is one unit period P0, the fifth interval S5 is equal to eight P0s, and the duration of the second adjustment signal Gb2 is less than the fifth interval S5, that is, P0<8 P0s.

Optionally, referring to FIG. 7, the interval between the end time of the first adjustment signal Gb1 and the start time of the second adjustment signal Gb2 is the fifth interval S5, the interval between the start time of the drive signal Ga and the end time of the drive signal Ga is the third interval S3, and the fifth interval S5 is greater than or equal to half of the third interval S3. In the embodiment of the present application, the first adjustment signal Gb1 is arranged in the first half of the drive signal Ga, and the second adjustment signal Gb2 is arranged in the second half of the drive signal Ga. The first adjustment signal Gb1 releases the built-in electric field in the first half, and the second adjustment signal Gb2 releases the built-in electric field in the second half. The superposed release can bring a larger brightness change value to the electrophoretic display panel, thereby improving the adjustment accuracy of the brightness change value.

Exemplarily, referring to FIG. 7, the first interval S1 is equal to two P0s. The duration of the first adjustment signal Gb1 is one unit period P0. The fifth interval S5 is equal to eight P0s. The duration of the second adjustment signal Gb2 is one unit period P0. The interval from the start time of the third drive sub-signal Ga3 to the end time of the third drive sub-signal Ga3 is the second interval S2, and the second interval S2 is equal to one P0. The start time of the drive signal Ga is the start time of the first drive sub-signal Ga1, and the end time of the drive signal Ga is the end time of the third drive sub-signal Ga3. The third interval S3 is equal to 13 P0s. The fifth interval S5 is greater than half of the third interval S3, that is, 8 P0s>6.5 P0s.

In other embodiments, in combination with the brightness requirement of the electrophoretic display panel, the first adjustment signal Gb1 and the second adjustment signal Gb2 may also be inserted into the first half of the drive signal Ga; or the first adjustment signal Gb1 and the second adjustment signal Gb2 may also be inserted into the second half of the drive signal Ga; the first adjustment signal Gb1 and the second adjustment signal Gb2 may release the built-in electric field in the first half or the second half, the superposed release can bring a larger brightness change value to the electrophoretic display panel, thereby achieving the target brightness of the electrophoretic display panel.

Optionally, referring to FIG. 7, the duration of the first adjustment signal Gb1 is at least one unit period P0, and the interval between the end time of the first adjustment signal Gb1 and the start time of the second adjustment signal Gb2 is the fifth interval S5. The duration of the first adjustment signal Gb1 is less than the fifth interval S5. In the embodiment of the present application, the duration of the first adjustment signal Gb1 is configured to be less than the interval between the first adjustment signal Gb1 and the second adjustment signal Gb2 to ensure that the time for establishing the built-in electric field is greater than the time for eliminating the built-in electric field.

Exemplarily, referring to FIG. 7, the duration of the first adjustment signal Gb1 is one unit period P0. The fifth interval S5 is equal to eight P0s, that is, the duration of the first adjustment signal Gb1 is less than the fifth interval S5.

Optionally, referring to FIG. 7, the duration of the first adjustment signal Gb1 is at least one unit period P0, and the interval between the start time of the first adjustment signal Gb1 and the start time of the drive signal Ga is the first interval S1. The duration of the first adjustment signal Gb1 is less than the first interval S1. In the embodiment of the present application, the time for eliminating the built-in electric field is configured to be less than the time for establishing the built-in electric field. After the first interval S1 of the built-in electric field is established in the first half of the drive signal Ga, the first adjustment signal Gb1 is inserted to release part of the built-in electric field to ensure that the built-in electric field is released after being accumulated in the first half of the drive signal Ga. In this manner, a small amount of adjustment can be brought to the display brightness change so that the brightness can be adjusted more precisely.

Exemplarily, referring to FIG. 7, the duration of the first adjustment signal Gb1 is one unit period P0. The first interval S1 is equal to two P0s, that is, the duration of the first adjustment signal Gb1 is less than the first interval S1.

Optionally, referring to FIG. 7, the duration of the first adjustment signal Gb1 is at least one unit period P0, the duration of the second adjustment signal Gb2 is at least one unit period P0, and the duration of the first adjustment signal Gb1 is equal to the duration of the second adjustment signal Gb2. In the embodiment of the present application, the duration of the first adjustment signal Gb1 is one unit period P0, and the duration of the second adjustment signal Gb2 is one unit period P0.

Figure 8:
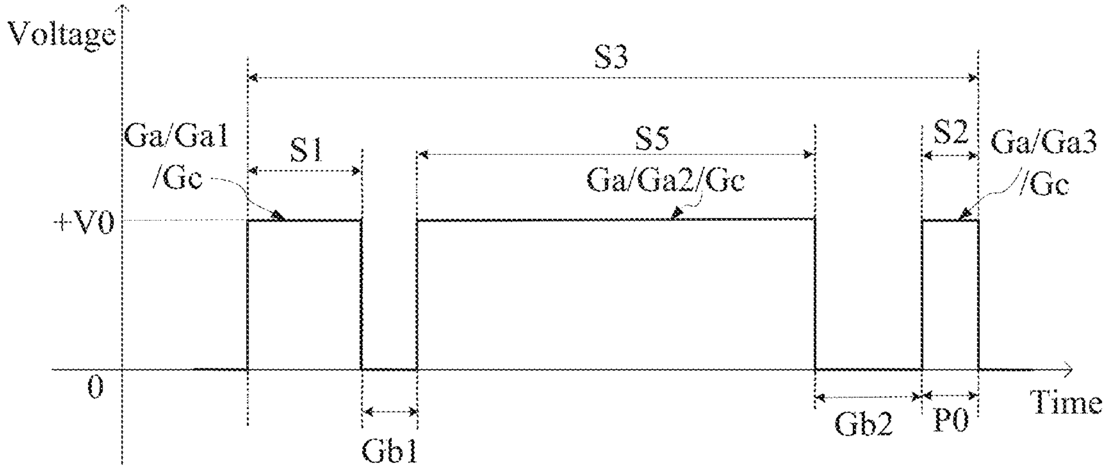
FIG. 8 is another drive timing diagram of an electrophoretic display panel according to an embodiment of the present application.

FIG. 8 is another drive timing diagram of an electrophoretic display panel according to an embodiment of the present application. Referring to FIG. 8, in other embodiments, the duration of the first adjustment signal Gb1 is not equal to the duration of the second adjustment signal Gb2. Exemplarily, the duration of the first adjustment signal Gb1 is one unit period P0. The duration of the second adjustment signal Gb2 is two unit periods P0. The duration of the second adjustment signal Gb2 is greater than the duration of the first adjustment signal Gb1 so that a larger brightness change value can be brought to the electrophoretic display panel in the second half of the drive signal Ga, thereby achieving the target brightness of the electrophoretic display panel.

Figure 9:
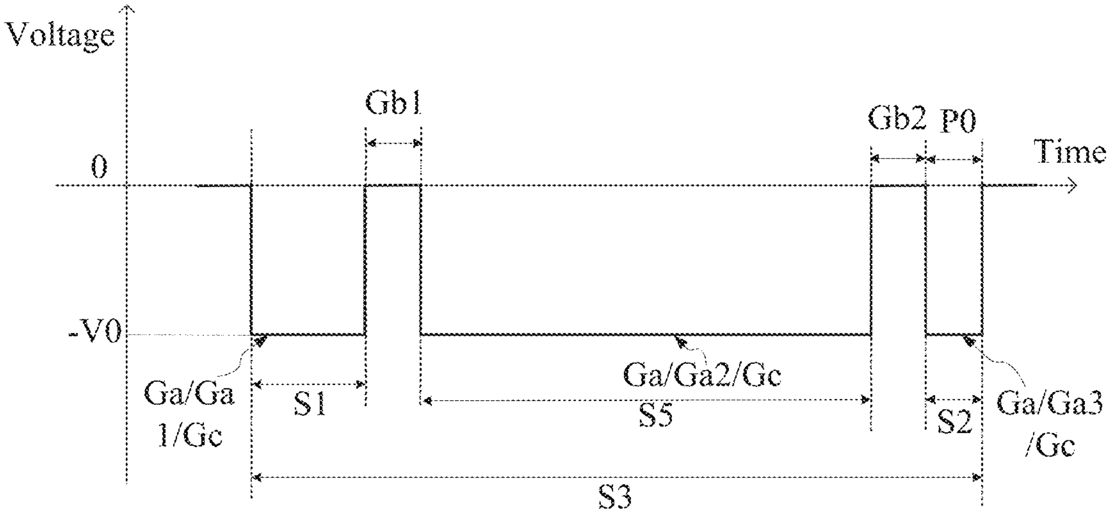
FIG. 9 is another drive timing diagram of an electrophoretic display panel according to an embodiment of the present application.
Figure 10:
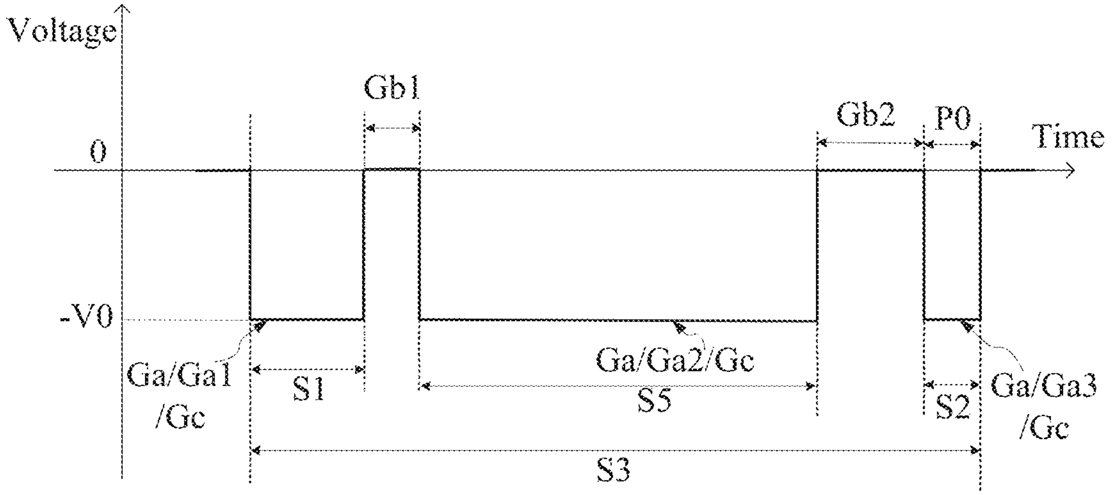
FIG. 10 is another drive timing diagram of an electrophoretic display panel according to an embodiment of the present application.

FIG. 9 is another drive timing diagram of an electrophoretic display panel according to an embodiment of the present application. FIG. 10 is another drive timing diagram of an electrophoretic display panel according to an embodiment of the present application. Referring to FIGS. 7 to 10, the multiple drive sub-signals Gc are provided and include the first drive sub-signal Ga1, the second drive sub-signal Ga2, and the third drive sub-signal Ga3 which are arranged sequentially. The first adjustment signal Gb1 is arranged between the first drive sub-signal Ga1 and the second drive sub-signal Ga2, and the second adjustment signal Gb2 is arranged between the second drive sub-signal Ga2 and the third drive sub-signal Ga3. The first drive sub-signal Ga1, the second drive sub-signal Ga2, and the third drive sub-signal Ga3 have the same voltage polarity. In the embodiment of the present application, the voltage of the drive sub-signal Gc may be a negative voltage or a positive voltage. For example, referring to FIGS. 7 and 8, the voltage of the drive sub-signal Gc is +V0. Referring to FIGS. 9 and 10, the voltage of the drive sub-signal Gc is −V0, and the voltage of the first adjustment signal Gb1 and the voltage of the second adjustment signal Gb2 are both 0 in the unit period P0.

Figure 11:
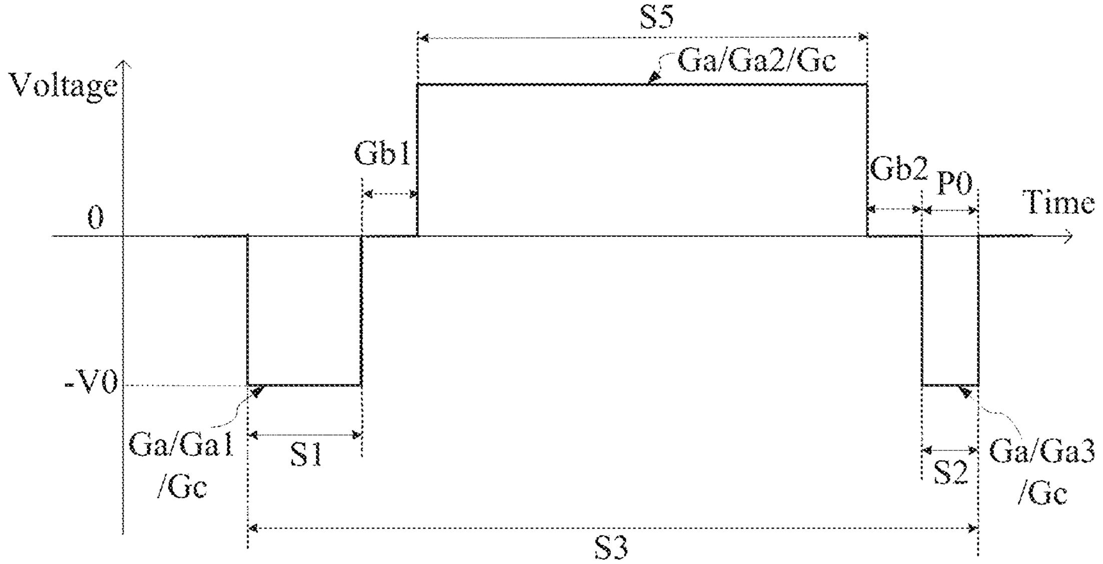
FIG. 11 is another drive timing diagram of an electrophoretic display panel according to an embodiment of the present application.

FIG. 11 is another drive timing diagram of an electrophoretic display panel according to an embodiment of the present application. Referring to FIG. 11, multiple drive sub-signals Gc are provided and include the first drive sub-signal Ga1, the second drive sub-signal Ga2, and the third drive sub-signal Ga3 that are arranged sequentially. The first adjustment signal Gb1 is arranged between the first drive sub-signal Ga1 and the second drive sub-signal Ga2, and the second adjustment signal Gb2 is arranged between the second drive sub-signal Ga2 and the third drive sub-signal Ga3. The first drive sub-signal Ga1, the second drive sub-signal Ga2, and the third drive sub-signal Ga3 include two voltage polarities. In the embodiment of the present application, the drive sub-signals Gc have at least two different voltages. The first adjustment signal Gb1 and the second adjustment signal Gb2 are inserted into the drive signal Ga so that a small amount of adjustment can be brought to the display brightness change, thereby adjusting the brightness more precisely. Furthermore, parameters such as the duration and voltage of the first adjustment signal Gb1 and the duration and voltage of the second adjustment signal Gb2 are configured so that the display brightness of the pixels can be controlled accurately, thereby achieving the target brightness.

Exemplarily, referring to FIG. 11, the voltage of the second drive sub-signal Ga2 is +V0, the voltage of the first drive sub-signal Ga1 and the voltage of the third drive sub-signal Ga3 are −V0, the voltage of the first adjustment signal Gb1 in the unit period P0 is 0, and the voltage of the second adjustment signal Gb2 in the unit period P0 is 0. The first adjustment signal Gb1 releases part of the built-in electric field accumulated by the first drive sub-signal Ga1, and the second adjustment signal Gb2 releases part of the built-in electric field accumulated by the first drive sub-signal Ga1 and the second drive sub-signal Ga2 so that a brightness change can be brought to the electrophoretic display panel, thereby being conducive to the achievement of the target brightness of the electrophoretic display panel.

Optionally, referring to FIGS. 3 to 11, the total duration of the adjustment signals Gb inserted into the drive signal Ga does not exceed five unit periods P0. Considering that the duration of the data signals includes the duration of the drive signal Ga and the duration of the adjustment signals Gb, if the number of adjustment signals Gb is too large, the response time of the data signals is too long, and the time loss is too large. In the embodiment of the present application, the total duration of all the adjustment signals Gb in the drive signal Ga is configured not to exceed five unit periods P0, which can not only bring a larger brightness change value to the electrophoretic display panel but also satisfy the fast response.

Optionally, referring to FIGS. 4 to 11, the data signal includes the data enable level and the data disable level. In an embodiment, the voltage of the data enable level includes a positive voltage or a negative voltage, and the voltage of the data disable level is zero. The at least one adjustment signal Gb includes a zero insertion signal, and the zero insertion signal includes a data disable level in a unit period P0. In the embodiment of the present application, the zero insertion signal may also be understood that the voltage of the data disable level is zero in the unit period P0. Referring to FIG. 2, under the action of an external electric field, the built-in electric field is present in the electrophoretic particles, and the zero insertion signal corresponds to a temporary removal of the external electric field, resulting in the built-in electric field being weakened. When the external electric field is applied again, the movement rate of the electrophoretic particles increases so that the electrophoretic particles can be adjusted to reach a preset position of the first substrate 11 or the second substrate 12 in the data signal drive stage, thereby bringing a slight brightness change to the electrophoretic display panel.

Exemplarily, referring to FIGS. 4 and 5, the adjustment signal Gb includes one zero insertion signal. Referring to FIG. 6, the adjustment signal Gb includes two adjacent zero insertion signals. Referring to FIGS. 7, 9, and 11, the multiple adjustment signals Gb include two zero insertion signals that are not adjacent. Referring to FIGS. 8 and 10, the multiple adjustment signals Gb include one zero insertion signal and two adjacent zero insertion signals.

Figure 12:
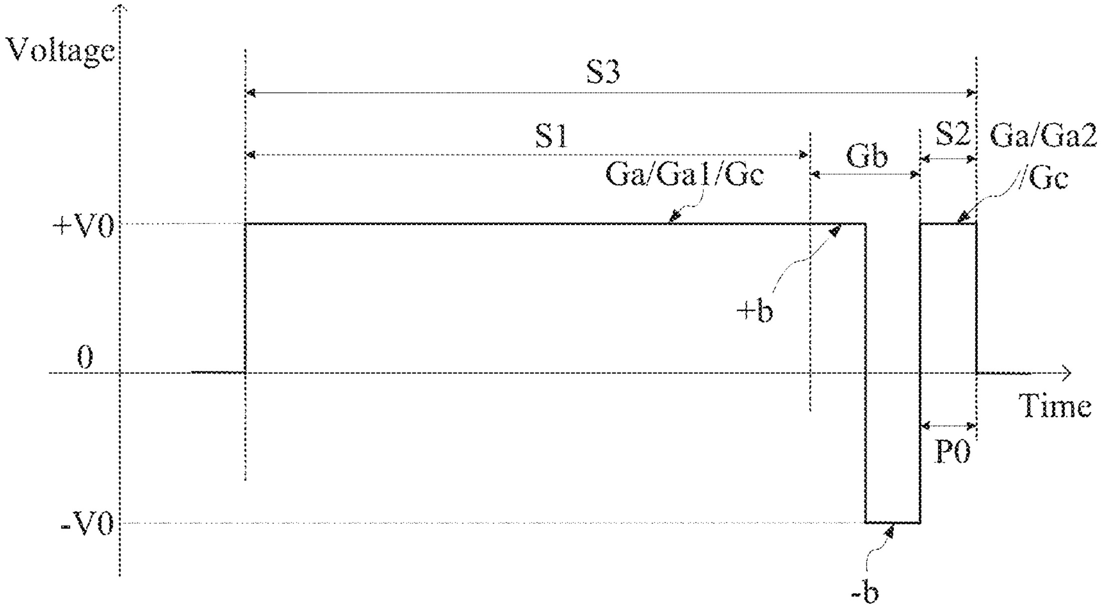
FIG. 12 is another drive timing diagram of an electrophoretic display panel according to an embodiment of the present application.

FIG. 12 is another drive timing diagram of an electrophoretic display panel according to an embodiment of the present application. Referring to FIG. 12, the adjustment signal Gb includes a pulse pair, and the pulse pair includes a positive pulse +b and a negative pulse −b; the positive pulse +b is a data enable level with a positive voltage, and the negative pulse −b is a data enable level with a negative voltage; the absolute value of the data enable level with the positive voltage is equal to the absolute value of the data enable level with the negative voltage. In the embodiment of the present application, the adjustment signal Gb may include at least one pulse pair, and each pulse pair includes one positive pulse +b and one negative pulse −b. When the drive is performed by the adjustment signal Gb, the positive pulse +b is inserted to strengthen the action of the external electric field and accumulate the built-in electric field; the negative pulse −b is inserted to change the direction of the external electric field and release the built-in electric field. In this manner, a small amount of adjustment can be brought to the display brightness change of the electrophoretic display panel so that the brightness can be adjusted more precisely.

Exemplarily, referring to FIG. 12, the adjustment signal Gb is inserted into the drive signal Ga, the adjustment signal Gb includes a pulse pair, and the pulse pair includes one positive pulse +b and one negative pulse −b. The data enable level of the drive signal Ga is a positive voltage, and the voltage is +V0; the voltage of the positive pulse +b of the pulse pair is +V0, and the voltage of the negative pulse −b of the pulse pair is −V0.

Figure 13:
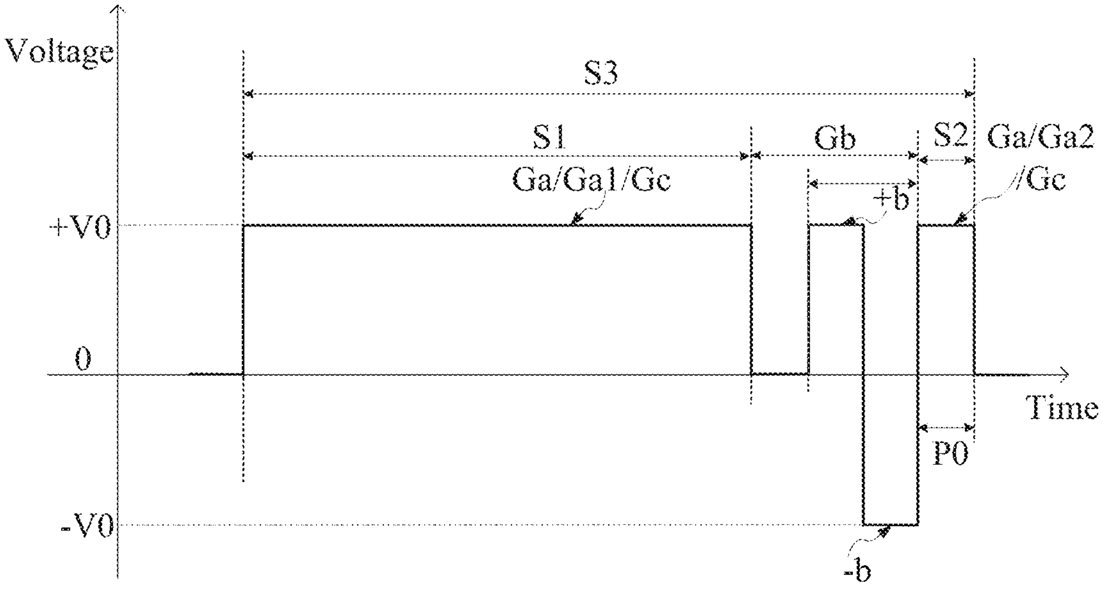
FIG. 13 is another drive timing diagram of an electrophoretic display panel according to an embodiment of the present application.

FIG. 13 is another drive timing diagram of an electrophoretic display panel according to an embodiment of the present application. Referring to FIG. 13, the adjustment signal Gb includes the zero insertion signal and the pulse pair, and the pulse pair includes the positive pulse +b and the negative pulse −b. In the embodiment of the present application, the adjustment signal Gb includes at least one zero insertion signal and at least one pulse pair. A small amount of adjustment is brought to the display brightness change through the zero insertion signal and the pulse pair so that the brightness can be adjusted more precisely.

Exemplarily, referring to FIG. 13, the adjustment signal Gb is inserted into the drive signal Ga, the adjustment signal Gb includes the zero insertion signal and the pulse pair, and the pulse pair includes the positive pulse +b and the negative pulse −b. The data enable level of the drive signal Ga is the positive voltage, and the voltage is +V0; the voltage of the zero insertion signal is 0; the voltage of the positive pulse +b of the pulse pair is +V0, and the voltage of the negative pulse −b of the pulse pair is −V0.

Some feasible configurations of the adjustment signal are listed below. In the following embodiments, the voltage of the drive signal Ga is +V0, −V0, or a combination of +V0 and −V0, which is not limited herein.

Figure 14:
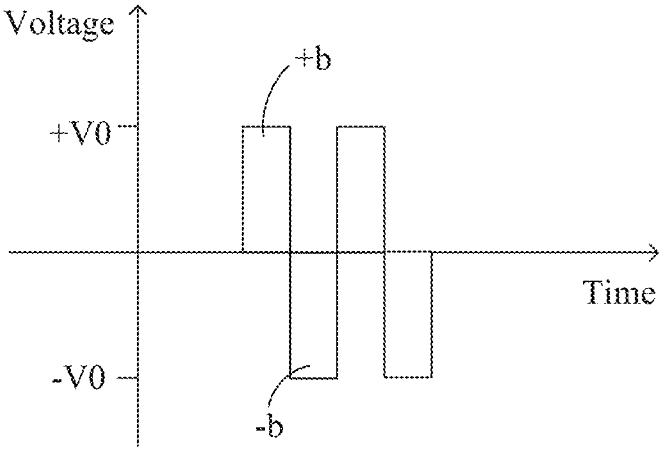
FIG. 14 is a drive timing diagram of an adjustment signal according to an embodiment of the present application.

FIG. 14 is a drive timing diagram of an adjustment signal according to an embodiment of the present application. Referring to FIG. 14, when the adjustment signal Gb includes the pulse pair, the adjustment signal Gb includes the positive pulse +b, the negative pulse −b, the positive pulse +b, and the negative pulse −b that are arranged sequentially. In the embodiment of the present application, the adjustment signal Gb includes one positive pulse +b, one negative pulse −b, one positive pulse +b, and one negative pulse −b, and the adjustment signal Gb is inserted into the drive signal Ga. The positive pulses +b accumulate the built-in electric field, and the negative pulses −b release the built-in electric field so that a small amount of adjustment can be brought to the display brightness change of the electrophoretic display panel, thereby adjusting the brightness more precisely and satisfying the requirement on the target brightness.

Figure 15:
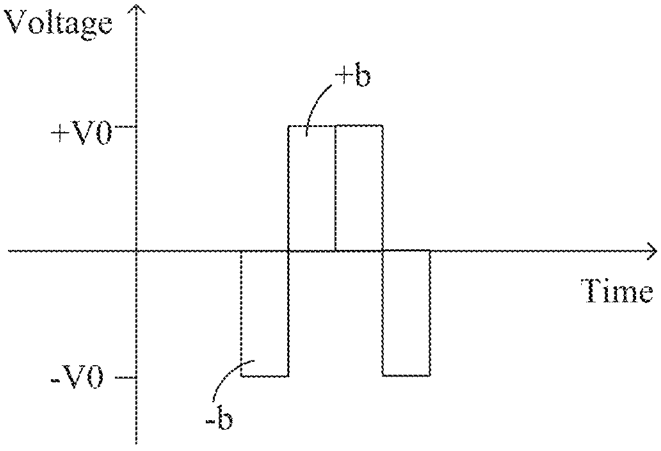
FIG. 15 is another drive timing diagram of an adjustment signal according to an embodiment of the present application.

FIG. 15 is another drive timing diagram of an adjustment signal according to an embodiment of the present application. Referring to FIG. 15, when the adjustment signal Gb includes the pulse pair, the adjustment signal Gb includes the negative pulse −b, the positive pulse +b, the positive pulse +b, and the negative pulse −b that are arranged sequentially. In the embodiment of the present application, the adjustment signal Gb includes one negative pulse −b, one positive pulse +b, one positive pulse +b, and one negative pulse −b, and the adjustment signal Gb is inserted into the drive signal Ga so that the brightness can be adjusted more precisely, and the requirement on the target brightness can be satisfied.

Figure 16:
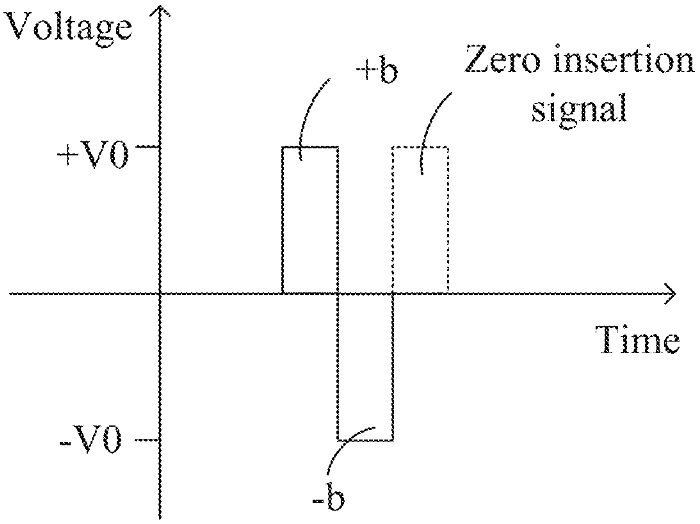
FIG. 16 is another drive timing diagram of an adjustment signal according to an embodiment of the present application.
Figure 17:
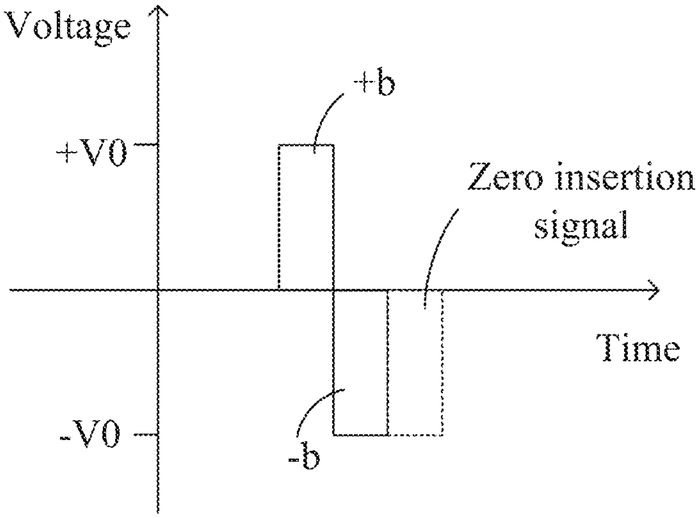
FIG. 17 is another drive timing diagram of an adjustment signal according to an embodiment of the present application.

FIG. 16 is another drive timing diagram of an adjustment signal according to an embodiment of the present application. FIG. 17 is another drive timing diagram of an adjustment signal according to an embodiment of the present application. Referring to FIGS. 16 and 17, when the adjustment signal Gb includes the zero insertion signal and the pulse pair, the pulse pair is adjacent to the zero insertion signal and precedes the zero insertion signal. In the embodiment of the present application, the pulse pair includes one positive pulse +b and one negative pulse −b, and the zero insertion signal follows the negative pulse −b. When the voltage of the drive signal in the write stage is the positive voltage, the adjustment signal Gb as shown in FIG. 16 may be inserted into the drive signal Ga; when the voltage of the drive signal in the write stage is a negative voltage, the adjustment signal Gb as shown in FIG. 17 may be inserted into the drive signal Ga to adjust the brightness more precisely and meet the requirement on the target brightness.

Figure 18:
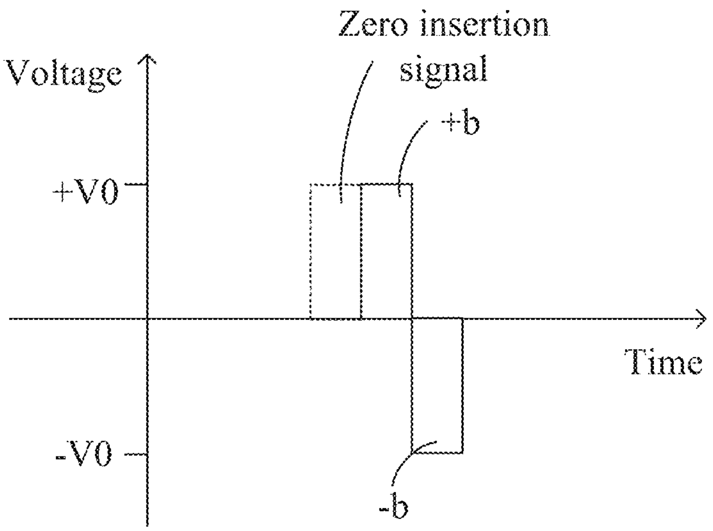
FIG. 18 is another drive timing diagram of an adjustment signal according to an embodiment of the present application.
Figure 19:
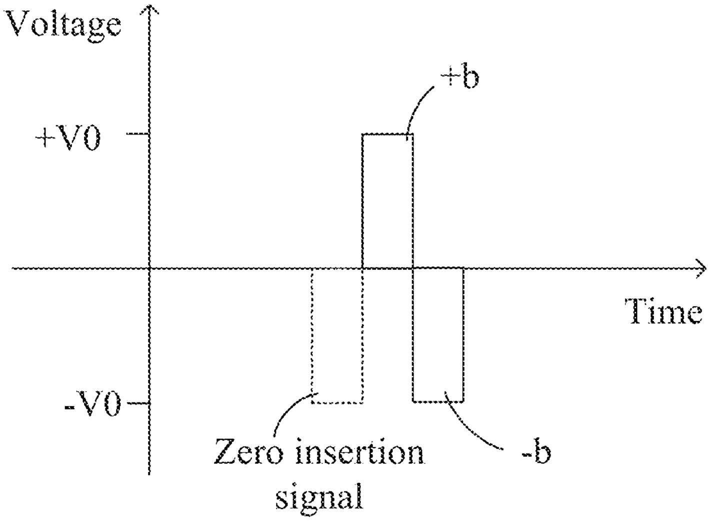
FIG. 19 is another drive timing diagram of an adjustment signal according to an embodiment of the present application.

FIG. 18 is another drive timing diagram of an adjustment signal according to an embodiment of the present application. FIG. 19 is another drive timing diagram of an adjustment signal according to an embodiment of the present application. Referring to FIGS. 18 and 19, when the adjustment signal Gb includes the zero insertion signal and the pulse pair, the pulse pair is adjacent to the zero insertion signal and follows the pulse pair. In the embodiment of the present application, the pulse pair includes one positive pulse +b and one negative pulse −b, and the zero insertion signal precedes the positive pulse +b. When the voltage of the drive signal in the write stage is the positive voltage, the adjustment signal Gb as shown in FIG. 18 may be inserted into the drive signal Ga; when the voltage of the drive signal in the write stage is the negative voltage, the adjustment signal Gb as shown in FIG. 19 may be inserted into the drive signal Ga to adjust the brightness more precisely and meet the requirement on the target brightness.

Figure 20:
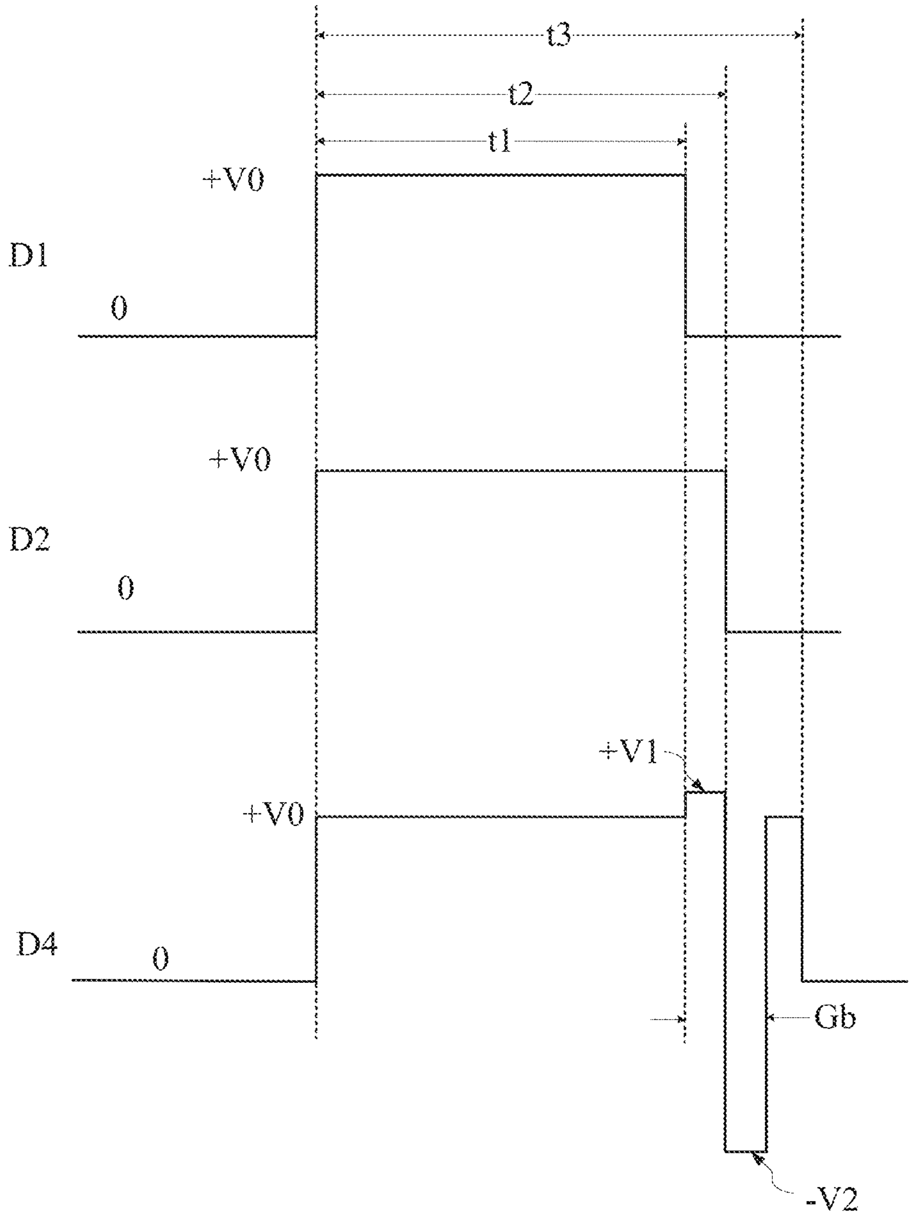
FIG. 20 is another drive timing diagram of an electrophoretic display panel according to an embodiment of the present application.

FIG. 20 is another drive timing diagram of an electrophoretic display panel according to an embodiment of the present application. Referring to FIG. 20, optionally, the data signals include data enable levels and data disable levels. The data enable levels include a first data enable level and a second data enable level, and the absolute value of the first data enable level is not equal to the absolute value of the second data enable level. In a solution using the zero insertion signal and/or the pulse pair, the absolute values of different data enable levels are the same. In the embodiment of the present application, as the absolute value of the first data enable level is not equal to the absolute value of the second data enable level, the precise adjustment can be achieved compared to the case where the absolute values of different data enable levels are the same. For example, after the adjustment voltage +V1 is inserted, there are voltage values other than positive and negative V0 to adjust.

Referring to FIG. 20, if the data signals in the write stage include the first drive signal D1, the duration of the first drive signal D1 is t1, and the brightness of the pixels driven by the first drive signal D1 is L1. If the data signals in the write stage include the second drive signal D2, the duration of the second drive signal D2 is t2, and the brightness of the pixels driven by the second drive signal D2 is L2. The target brightness of the electrophoretic display panel is Ln, and L1<Ln<L2·t2>t1, and t2−t1=P0. If the first drive signal D1 or the second drive signal D2 is only used, the display brightness of the pixels cannot be controlled accurately, and the target brightness cannot be achieved.

In the embodiment of the present application, the adjustment signal Gb may be inserted into the drive signal in the write stage, the adjustment signal Gb is the pulse pair, the pulse pair includes the positive pulse +b and the negative pulse −b that are arranged sequentially, and the absolute value of the voltage of the positive pulse +b is different from the absolute value of the voltage of the negative pulse −b. Exemplarily, referring to FIG. 20, the adjustment signal Gb is the pulse pair, the voltage of the positive pulse +b is +V1, and the voltage of the negative pulse −b is −V2·|+V1|≠|−V2|. In the write stage, the pulse pair having different voltage absolute values may be inserted into the second drive signal D2 to obtain a fourth drive signal D4 so that a brightness value that cannot be achieved by PWM adjustment can be achieved.

For example, the positive voltage for whitening and the negative voltage for blackening are used as an example. If V1>V2>V0>0, the brightness before voltage V2 is inserted is less than the brightness after the voltage V2 is inserted. If V1>V0>V2, the brightness before the voltage V2 is inserted is greater than the brightness after the voltage V2 is inserted. In this manner, the display brightness of the pixels of the electrophoretic display panel can be accurately controlled to achieve the target brightness.

It is to be noted that due to different materials of the electrophoretic particles, the blackening response duration of the electrophoretic display panel is not equal to the whitening response duration of the electrophoretic display panel. In some embodiments, the electrophoretic display panel shows that the blackening response rate is greater than the whitening response rate. In some embodiments, the electrophoretic display panel shows that the blackening response rate is less than the whitening response rate. The blackening response duration refers to a duration required to drive the pixel 23 from 90% of the maximum brightness to 10% of the maximum brightness, and the whitening response duration refers to a duration required to drive the pixel 23 from 10% of the maximum brightness to 90% of the maximum brightness.

The black electrophoretic particles and the white electrophoretic particles are used as an example in the embodiment of the present application. The drive of the electrophoretic display panel is explained in the following embodiment using an example where the electrophoretic display panel shows that the blackening response rate is greater than the whitening response rate, and the drive signal has a positive potential (+V0) for whitening and a negative potential (−V0) for blackening.

Referring to FIG. 3, in the drive stage, assuming that the drive voltage of the drive signal Ga is $V_i$, the drive time of the drive signal Ga is $t_i$, and $t_i$ is measured in frame time units, the effective drive power is $\overline{V_i}=\Sigma V_i t_i$.

The drive voltage of the first drive signal D1 is $+V_0$, the drive time of the first drive signal D1 is t1, and the effective drive power of the first drive signal D1 is $\overline{V_1}=\Sigma V_0 t_1$. $\overline{V_1}$ denotes that the brightness of the driven pixels is L1, and the grayscale corresponding to the brightness L1 is G1.

The drive voltage of the second drive signal D2 is $+V_0$, the drive time of the second drive signal D2 is t2, and the effective drive power of the second drive signal D2 is $\overline{V_2}=\Sigma V_0 t_2$. $\overline{V_2}$ denotes that the brightness of the driven pixels is L2, and the grayscale corresponding to the brightness L2 is G2.

When $t_2>t_1$, and $\overline{V_2}>\overline{V_1}$, L2>L1. P0=$t_2-t_1$. P0 is a unit period.

When the target brightness of the pixels is Ln, and L1<Ln<L2, the at least one adjustment signal Gb provided in the preceding embodiment may be inserted into the drive signal in the write stage to obtain a third drive signal D3.

In some embodiments, referring to FIG. 3, the adjustment signal Gb is the zero insertion signal, and the voltage of the zero insertion signal is zero. For the drive signal having the positive voltage for whitening, when the brightness L1 of the pixels driven by the existing first drive signal D1 is lower than the target brightness Ln, and one frame is added to the effective drive, that is, the brightness L2 achieved by using the second drive signal D2 is higher than the target brightness Ln, the zero insertion signal is inserted into the first drive signal D1 for driving so that the brightness L1 achieved by the first drive signal D1 can be increased to the target brightness Ln.

Figure 21:
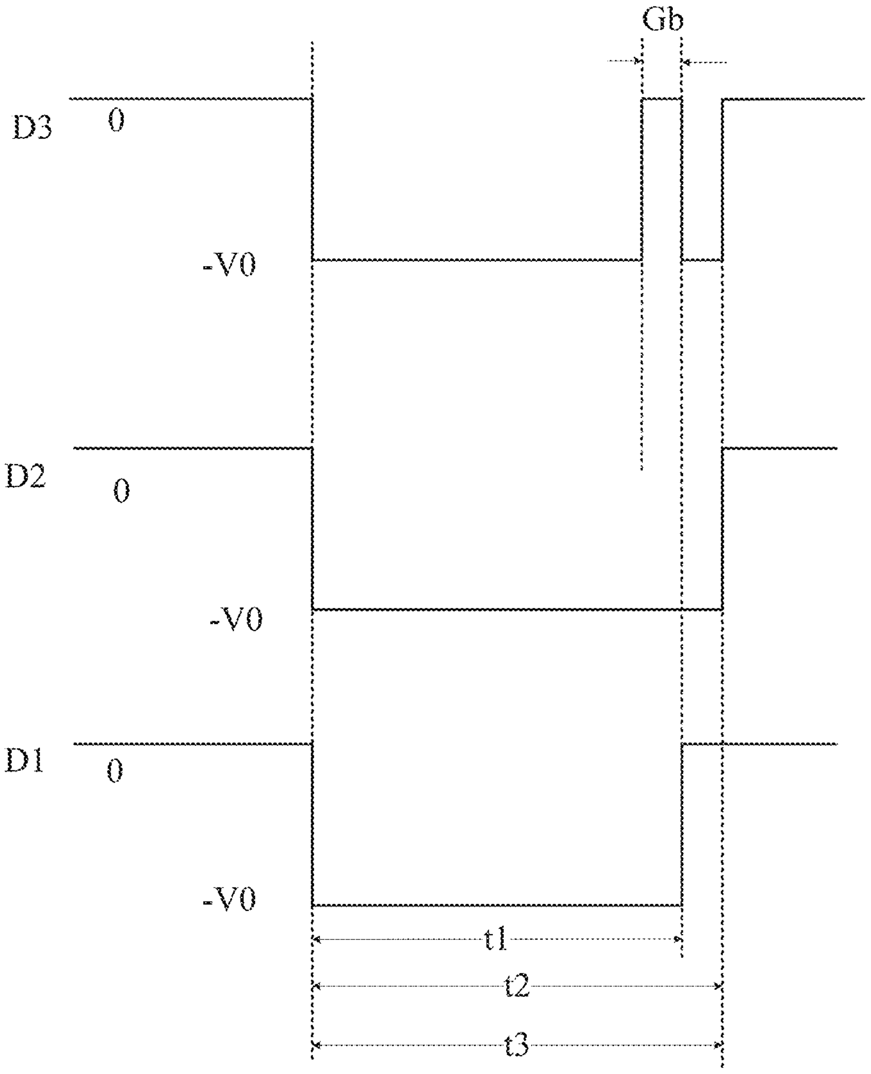
FIG. 21 is another drive timing diagram of an electrophoretic display panel according to an embodiment of the present application.

FIG. 21 is another drive timing diagram of an electrophoretic display panel according to an embodiment of the present application. Referring to FIG. 21, in some embodiments, the adjustment signal Gb is the zero insertion signal, and the voltage of the zero insertion signal is zero. For the drive signal having the negative voltage for blackening, when the brightness L2 achieved by the existing second drive signal D2 is higher than the target brightness Ln, and one frame is subtracted from the effective drive, that is, the brightness L1 achieved by using the first drive signal D1 is lower than the target brightness Ln, the zero insertion signal may be inserted into the existing second drive signal D2 for driving so that the brightness L2 achieved by the existing second drive signal D2 can be decreased to the target brightness Ln and adjusted to the target grayscale.

In some embodiments, referring to FIG. 12, the adjustment signal Gb is the pulse pair, and the pulse pair includes one positive pulse +b and one negative pulse −b. For the positive voltage for whitening, when the brightness L achieved by the existing drive signal is lower than the target brightness Ln, and the brightness L' achieved after one frame is added to the drive signal is higher than the target brightness Ln, the pulse pair may be inserted based on the drive signal corresponding to the brightness L' to obtain the drive signal Ga and the pulse pair that are shown in FIG. 12 so that the brightness L' achieved by the existing drive signal can be decreased to the target brightness Ln and adjusted to the target grayscale.

Figure 22:
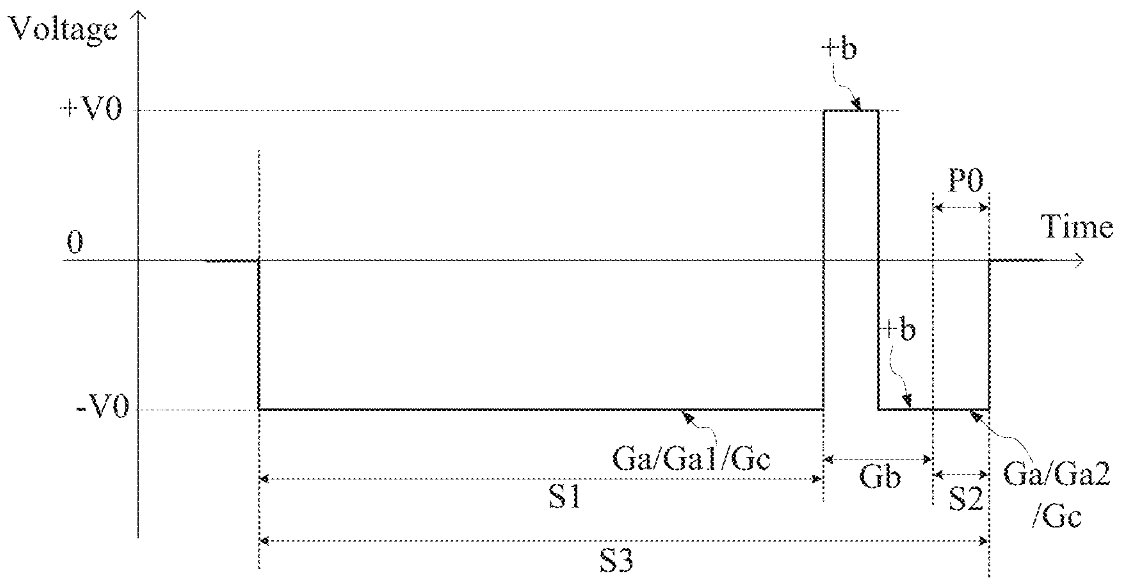
FIG. 22 is another drive timing diagram of an electrophoretic display panel according to an embodiment of the present application.

FIG. 22 is another drive timing diagram of an electrophoretic display panel according to an embodiment of the present application. In some embodiments, referring to FIG. 22, the adjustment signal Gb is the pulse pair, and the pulse pair includes one positive pulse +b and one negative pulse −b. For the drive signal having the negative voltage for blackening, when the brightness L achieved by the existing drive signal is higher than the target brightness Ln, and the brightness L' achieved after one frame is subtracted from the existing drive signal is lower than the target brightness Ln, the pulse pair may be inserted based on the existing drive signal corresponding to the brightness L to obtain the drive signal Ga and the pulse pair that are shown in FIG. 22 so that the brightness L achieved by the existing drive signal can be decreased to the target brightness Ln and adjusted to the target grayscale.

Optionally, referring to FIGS. 1 and 4, in the write stage P1, different data signals are written into at least two pixels 23. It is to be understood that the write stage P1 is a stage for performing a differentiation operation, and the different data signals are written into the at least two pixels 23 in the write stage P1 so that the image display of the electrophoretic display panel can be achieved.

Figure 23:
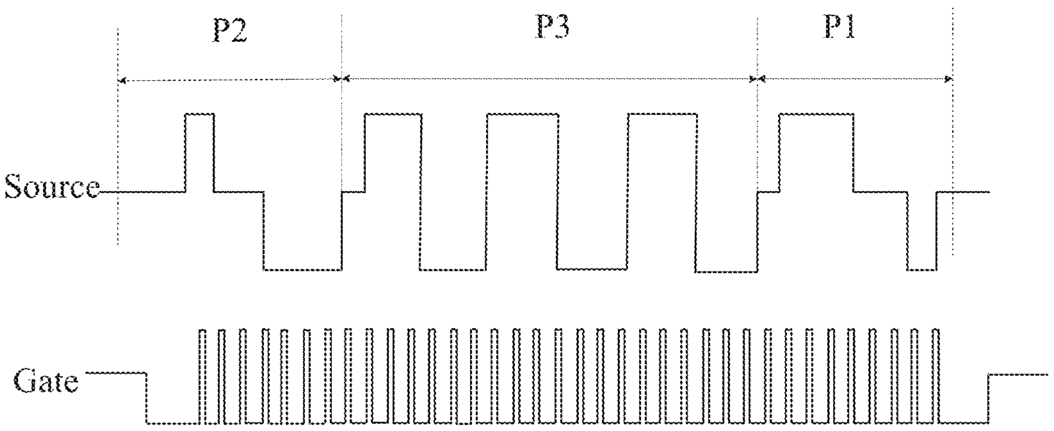
FIG. 23 is a drive timing diagram of an electrophoretic display panel according to an embodiment of the present application.

FIG. 23 is a drive timing diagram of an electrophoretic display panel according to an embodiment of the present application. Referring to FIGS. 1, 2, and 23, before the write stage P1 of the electrophoretic display panel, the drive stage of the electrophoretic display panel may further include an erasing stage P2 and/or an activation stage P3. In the embodiment of the present application, the drive stage of the electrophoretic display panel includes the erasing stage P2, the activation stage P3, and the write stage P1 which are arranged sequentially. In the erasing stage P2, the same data signal Source is provided for the different pixels 23, the different pixels 23 may have the same display brightness and the same grayscale, and the electrophoretic display panel is driven to a uniform optical limit (a black grayscale or a white grayscale), which is conducive to the elimination of the residual image of the previous frame. Before the drive signal of the write stage P1 arrives, the electrophoretic particles of the pixels 23 are in the same spatial position.

In the activation stage P3, the same data signal Source is provided for the different pixels 23. The activation stage P3 is configured to activate the electrophoretic particles and prevent the electrophoretic particles having different charges from agglomerating.

Exemplarily, referring to FIGS. 1 and 23, FIG. 23 further illustrates a scan signal Gate on one scan line 21. The interval between two pulses in the scan signal Gate includes one unit period P0. In one unit period P0, the scan lines 21 are scanned row by row from the first scan line 21 to the last scan line 21.

It is to be noted that if the pixels remain in the same state for a long time, the mobility of the charged electrophoretic particles increases, which is not conducive to the display of the next stage. The electrophoretic display panel may be driven multiple times to reach the optical limit so that the activity of the electrophoretic particles can be increased.

Figure 24:
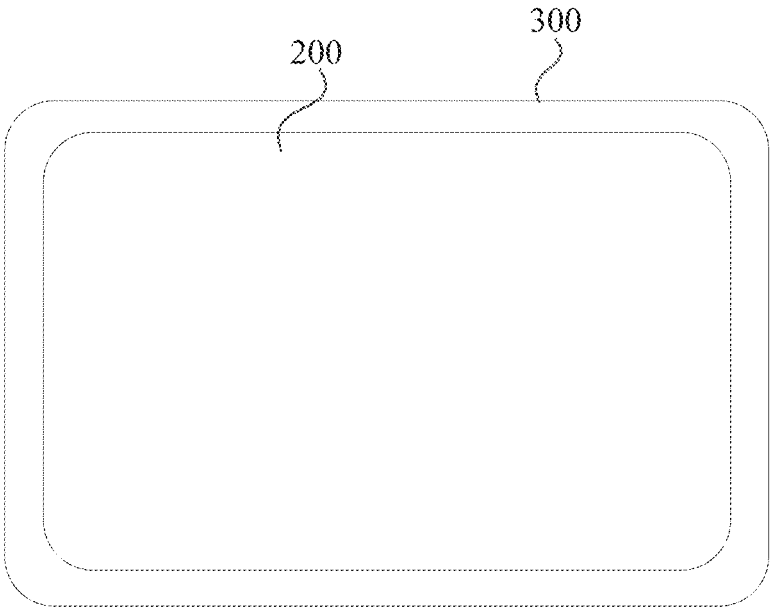
FIG. 24 is a top diagram of a display device according to an embodiment of the present application.

Based on the same inventive concept, an embodiment of the present application further provides a display device. FIG. 24 is a top diagram of a display device according to an embodiment of the present application. Referring to FIG. 24, the display device 300 includes the electrophoretic display panel 200 provided in the preceding embodiments. Therefore, the display device also has the beneficial effects of the electrophoretic display panel of any preceding embodiment. For the same details, reference may be made to the preceding description of the electrophoretic display panel. Details are not repeated herein.

The display device 300 provided in the embodiment of the present application may be the electronic paper as shown in FIG. 24, or may be any electronic product having a display function, including, but not limited to: a mobile phone, a television, a laptop, a desktop display, a tablet computer, a digital camera, a smart bracelet, smart glasses, an in-vehicle display, industry-controlling equipment, a medical display, or a touch interactive terminal, which is not specifically limited in the embodiment of the present application.

It is to be noted that the preceding are preferred embodiments of the present application and technical principles used therein. It is to be understood by those skilled in the art that the present application is not limited to the embodiments described herein. Those skilled in the art can make various apparent modifications, adaptations, combinations, and substitutions without departing from the scope of the present application. Therefore, though the present application has been described in detail through the preceding embodiments, the present application is not limited to the preceding embodiments and may include other equivalent embodiments without departing from the concept of the present application. The scope of the present application is determined by the scope of the appended claims.

What is claimed is:

1. An electrophoretic display panel, comprising:

a first substrate and electrophoretic particles; and a scan line, a data line, and a pixel located on a side of the first substrate facing the electrophoretic particles, the scan line configured to transmit a scan signal to the pixel, the data line configured to transmit a data signal to the pixel, and the data signal comprising a plurality of unit periods, wherein, in a write stage comprised in a drive stage of the electrophoretic display panel, the data signal comprises a drive signal and at least one adjustment signal inserted into the drive signal and configured to divide the drive signal into at least two drive sub-signals, wherein a drive sub-signal of the at least two drive sub-signals maintains a constant voltage during a duration;

an interval between a start time of a first drive sub-signal of the at least two drive sub-signals and a start time of the at least one adjustment signal is greater than an interval between an end time of the at least one adjustment signal and an end time of a last drive sub-signal of the at least two drive sub-signals; and wherein the at least one adjustment signal comprises at least one unit period; and a voltage of a drive sub-signal of the at least two drive sub-signals is different from a voltage of the at least one adjustment signal during a duration in at least one unit period.

2. The electrophoretic display panel of claim 1, wherein in the write stage, a difference between brightness of the pixel driven by the data signal and brightness of the pixel driven by the drive signal is a brightness difference, and the brightness difference is less than a brightness change value of the pixel driven by the drive signal in a unit period of the plurality of unit periods.

3. The electrophoretic display panel of claim 1, wherein one adjustment signal is provided, and the interval between the start time of the at least one adjustment signal and the start time of the first drive sub-signal is greater than or equal to half of an interval between the start time of the first drive sub-signal and the end time of the last drive sub-signal.

4. The electrophoretic display panel of claim 1, wherein the last drive sub-signal of the at least two drive sub-signals comprises one of the plurality of unit periods.

5. The electrophoretic display panel of claim 1, wherein a plurality of adjustment signals are provided and comprise a first adjustment signal and a second adjustment signal following the first adjustment signal; and at least one of the at least two drive sub-signals exists between the first adjustment signal and the second adjustment signal.

6. The electrophoretic display panel of claim 5, wherein a duration of the second adjustment signal is less than an interval between an end time of the first adjustment signal and a start time of the second adjustment signal.

7. The electrophoretic display panel of claim 6, wherein the interval between the end time of the first adjustment signal and the start time of the second adjustment signal is greater than or equal to half of an interval between a start time of the drive signal and an end time of the drive signal.

8. The electrophoretic display panel of claim 5, wherein, a duration of the first adjustment signal is less than an interval between an end time of the first adjustment signal and a start time of the second adjustment signal; or a duration of the first adjustment signal is less than an interval between a start time of the first adjustment signal and a start time of the drive signal; or a duration of the first adjustment signal is equal to a duration of the second adjustment signal.

9. The electrophoretic display panel of claim 5, wherein a plurality of drive sub-signals are provided and comprise the first drive sub-signal, a second drive sub-signal, and a third drive sub-signal that are arranged sequentially; the first adjustment signal is arranged between the first drive sub-signal and the second drive sub-signal, and the second adjustment signal is arranged between the second drive sub-signal and the third drive sub-signal; and the first drive sub-signal, the second drive sub-signal, and the third drive sub-signal have a same voltage polarity.

10. The electrophoretic display panel of claim 5, wherein a plurality of drive sub-signals are provided and comprise the first drive sub-signal, a second drive sub-signal, and a third drive sub-signal that are arranged sequentially; the first adjustment signal is arranged between the first drive sub-signal and the second drive sub-signal, and the second adjustment signal is arranged between the second drive sub-signal and the third drive sub-signal; and the first drive sub-signal, the second drive sub-signal, and the third drive sub-signal comprise two voltage polarities.

11. The electrophoretic display panel of claim 1, wherein, a total duration of the at least one adjustment signal inserted into the drive signal is less than or equal to five of the plurality of unit periods; or in the write stage, different data signals are written into at least two pixels.

12. The electrophoretic display panel of claim 1, wherein the data signal comprises a data enable level and a data disable level; and the at least one adjustment signal comprises a zero insertion signal comprising a data disable level in a unit period of the plurality of unit periods; and/or the at least one adjustment signal comprises a pulse pair comprising a positive pulse and a negative pulse, wherein the positive pulse is a data enable level with a positive voltage, the negative pulse is a data enable level with a negative voltage, and an absolute value of the data enable level with the positive voltage is equal to an absolute value of the data enable level with the negative voltage.

13. The electrophoretic display panel of claim 12, wherein in response to the at least one adjustment signal comprising a plurality of pulse pairs, the at least one adjustment signal comprises a positive pulse, a negative pulse, a positive pulse, and a negative pulse arranged sequentially; or the at least one adjustment signal comprises a negative pulse, a positive pulse, a positive pulse, and a negative pulse arranged sequentially.

14. The electrophoretic display panel of claim 12, wherein in response to the at least one adjustment signal comprising the zero insertion signal and the pulse pair, the pulse pair is adjacent to the zero insertion signal and precedes the zero insertion signal.

15. The electrophoretic display panel of claim 12, wherein in response to the at least one adjustment signal comprising the zero insertion signal and the pulse pair, the pulse pair is adjacent to the zero insertion signal and follows the pulse pair.

16. The electrophoretic display panel of claim 1, wherein the data signal comprises a data enable level and a data disable level; and the data enable level comprises a first data enable level and a second data enable level, and an absolute value of the first data enable level is not equal to an absolute value of the second data enable level.

17. The electrophoretic display panel of claim 1, wherein a blackening response duration of the electrophoretic display panel is not equal to a whitening response duration of the electrophoretic display panel, wherein the blackening response duration refers to a duration required to drive the pixel from 90% to 10% of a maximum brightness of the pixel, and the whitening response duration refers to a duration required to drive the pixel from 10% to 90% of the maximum brightness.

18. A display device, comprising an electrophoretic display panel comprising:

a first substrate and electrophoretic particles; and a scan line, a data line, and a pixel located on a side of the first substrate facing the electrophoretic particles, the scan line configured to transmit a scan signal to the pixel, the data line configured to transmit a data signal to the pixel, and the data signal comprising a plurality of unit periods, wherein, in a write stage comprised in a drive stage of the electrophoretic display panel, the data signal comprises a drive signal and at least one adjustment signal inserted into the drive signal and configured to divide the drive signal into at least two drive sub-signals, wherein a drive sub-signal of the at least two drive sub-signals maintains a constant voltage during a duration;

an interval between a start time of a first drive sub-signal of the at least two drive sub-signals and a start time of the at least one adjustment signal is greater than an interval between an end time of the at least one adjustment signal and an end time of a last drive sub-signal of the at least two drive sub-signals; and wherein the at least one adjustment signal comprises at least one unit period; and a voltage of a drive sub-signal of the at least two drive sub-signals is different from a voltage of the at least one adjustment signal during a duration in at least one unit period.

* * * * *